(12) United States Patent
Watanabe et al.

(10) Patent No.: US 7,932,694 B2
(45) Date of Patent: Apr. 26, 2011

(54) BATTERY CHARGER OPERABLE FOR SELECTIVE ONE OF A PLURALITY OF POWER SUPPLIES

(75) Inventors: Shinji Watanabe, Hitachinaka (JP); Yasushi Nakano, Hitachinaka (JP); Haruhisa Fujisawa, Hitachinaka (JP); Nobuhiro Takano, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 495 days.

(21) Appl. No.: 12/050,249

(22) Filed: Mar. 18, 2008

(65) Prior Publication Data

US 2008/0231236 A1    Sep. 25, 2008

(30) Foreign Application Priority Data

Mar. 19, 2007   (JP) ................. P2007-071643

(51) Int. Cl.
*H02J 7/00* (2006.01)
(52) U.S. Cl. .................. 320/113; 320/115; 320/138
(58) Field of Classification Search .................. 320/113, 320/114, 115
See application file for complete search history.

(56) References Cited

U.S. PATENT DOCUMENTS

| | | | | |
|---|---|---|---|---|
| 5,731,683 | A * | 3/1998 | Nakanishi | 320/111 |
| 6,566,843 | B2 * | 5/2003 | Takano et al. | 320/114 |
| 7,535,196 | B2 * | 5/2009 | Nagasawa | 320/114 |
| 7,733,060 | B2 | 6/2010 | Kojima | |
| 2002/0071670 | A1 * | 6/2002 | Odaka et al. | 396/206 |

FOREIGN PATENT DOCUMENTS

| | | |
|---|---|---|
| CN | 1905306 | 1/2007 |
| JP | 7-241040 | 9/1995 |
| JP | 11-41829 | 2/1999 |
| JP | 2002-199724 | 7/2002 |
| JP | 2005-245145 | 9/2005 |
| JP | 2007-14163 | 1/2007 |

* cited by examiner

*Primary Examiner* — Edward Tso
*Assistant Examiner* — M'Baye Diao
(74) *Attorney, Agent, or Firm* — Antonelli, Terry, Stout & Kraus, LLP.

(57) ABSTRACT

A battery charger is configured to use selective one of two or more power supplies including a commercial AC power supply and a DC power supply. An AC cable is fixedly secured to the body of the battery charger and a DC cable is detachably connected to the body of the battery charger. A single transformer is employed that has a first primary winding to which the AC power supply is connected a first switching element, a second primary winding to which the DC power supply is connected via a second switching element, and a secondary winding to which a battery pack to be charged is coupled.

21 Claims, 5 Drawing Sheets

BATTERY CHARGER OPERABLE FOR SELECTIVE ONE OF A PLURALITY OF POWER SUPPLIES

BACKGROUND

1. Field of the Invention

The present invention relates to a battery charger for charging rechargeable secondary batteries, such as nickel-cadmium batteries, lithium-ion batteries.

2. Description of the Related Art

Rechargeable secondary batteries have been widely used as a power source of portable devices, such as a cordless power tools. Conventional battery chargers for charging such secondary batteries are, in use, connected to a commercial power supply. However, when the cordless power tool is used in places where the commercial power supply is not available, the user has to bring extra batteries for replacement with the empty batteries.

To resolve the above-mentioned problem, Japanese Patent Application Publication No. 2005-245145 proposes a battery charger capable of charging secondary batteries while being supplied with power from various types of power supplies including the commercial power supply.

However, the battery charger disclosed in Japanese Patent Application Publication No. 2005-245145 accommodates a plurality of power source circuits corresponding to the number of available power supplies, so that the size of the battery charger becomes large. In addition, the secondary batteries charged by the battery charger disclosed in Japanese Patent Application Publication No. 2005-245145 are overcharged when a particular power supply is used. The secondary batteries might be physically destroyed or generate an undue amount of heat due to overcharging. Hence, battery chargers capable of safely charging the batteries have been sought in the art.

SUMMARY OF THE INVENTION

In view of the foregoing, it is an object of the invention to provide a battery charger that can charge rechargeable batteries using selective one of a plurality of power supplies without enlarging the size of the battery charger.

It is another object of the invention to provide a battery charger configured from a simplified circuit arrangement.

To achieve the above and other objects, a battery charger according to the invention includes a body that is connectable to a battery pack containing a battery and charges the battery; a first connecting member having one end connectable to a first power supply and another end connectable to the body; and a second connecting member having one end connectable to a second power supply and another end connectable to the body.

The body may include a first voltage detector that detects a voltage generated by the first power supply; a second voltage detector that detects a voltage generated by the second power supply; and a control unit that selectively uses one of the first and second power supplies as a power source of the body in response to outputs from the first and second voltage detectors.

The body may further include a first switching element; a first switching controller connected to the first switching element for controlling the first switching element; a second switching element; a second switching controller connected to the second switching element for controlling the second switching element; and a transformer. The transformer has a first primary winding to which the first power supply is connectable via the first switching element, a second primary winding to which the second power supply is connectable via the second switching element, and a secondary winding to which the battery pack is connected.

The body may further include a charge stop circuit that generates a charge stop signal in response to a charge stop instruction received from the battery pack, wherein the charge stop circuit applies the charge stop signal to both the first and second switching controllers to stop charging the battery.

It is preferable that the control unit uses the first power supply when the output from the first input voltage detector indicates that the first power supply is connected to the first primary winding of the transformer whereas the control unit uses the second power supply when the output from the second input voltage detector indicates that the second power supply is connected to the second primary winding of the transformer.

It is further preferable that the control unit does not permit charging the battery when the outputs from the first and second input voltage detectors indicate that both the first and second power supplies are connected to the first and second primary windings of the transformer, respectively.

In addition to the first switching element, first switching controller, second switching element, second switching controller, and the transformer, the body may further include an output controller that controls a charge current or a charge voltage applied to the battery through the secondary winding of the transformer; a current/voltage setter that sets the charge current or a charge voltage applied to the battery. In this case, the control unit further controls the current/voltage setter to set the charge current or the charge voltage depending upon the first power supply and the second power supply whichever is selected, and a status of the battery instructed from the battery pack. For example, the battery pack instructs any one or all of a temperature of the battery, a number of cells constituting the battery, and a type of the battery, e.g., nickel-cadmium battery, lithium-ion battery or the like, to the control unit as the status of the battery.

The first power supply is, for example, selected to be a commercial AC power supply, and the second power supply to be a DC power supply.

BRIEF DESCRIPTION OF THE DRAWINGS

The particular features and advantages of the invention as well as other objects will become apparent from the following description taken in connection with the accompanying drawings, in which.

DETAILED DESCRIPTION OF THE PREFERRED EMBODIMENTS

Figure 1:
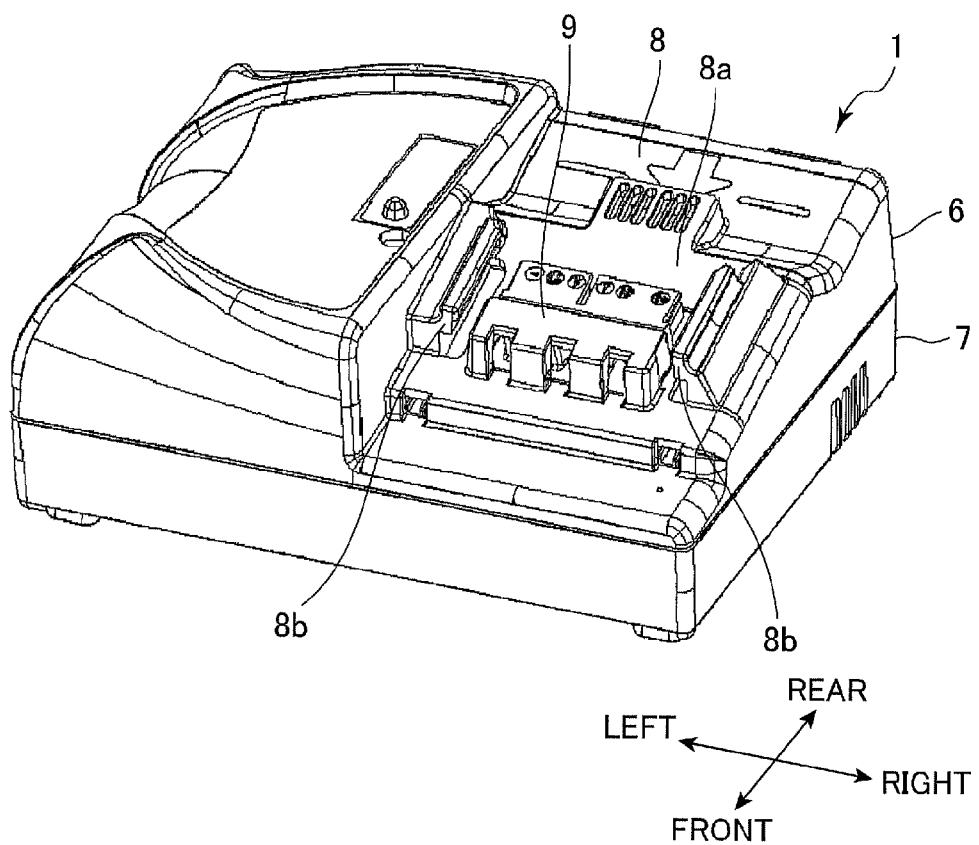
FIG. 1 is a perspective view showing a battery charger in accordance with one embodiment of the invention.
Figure 2:
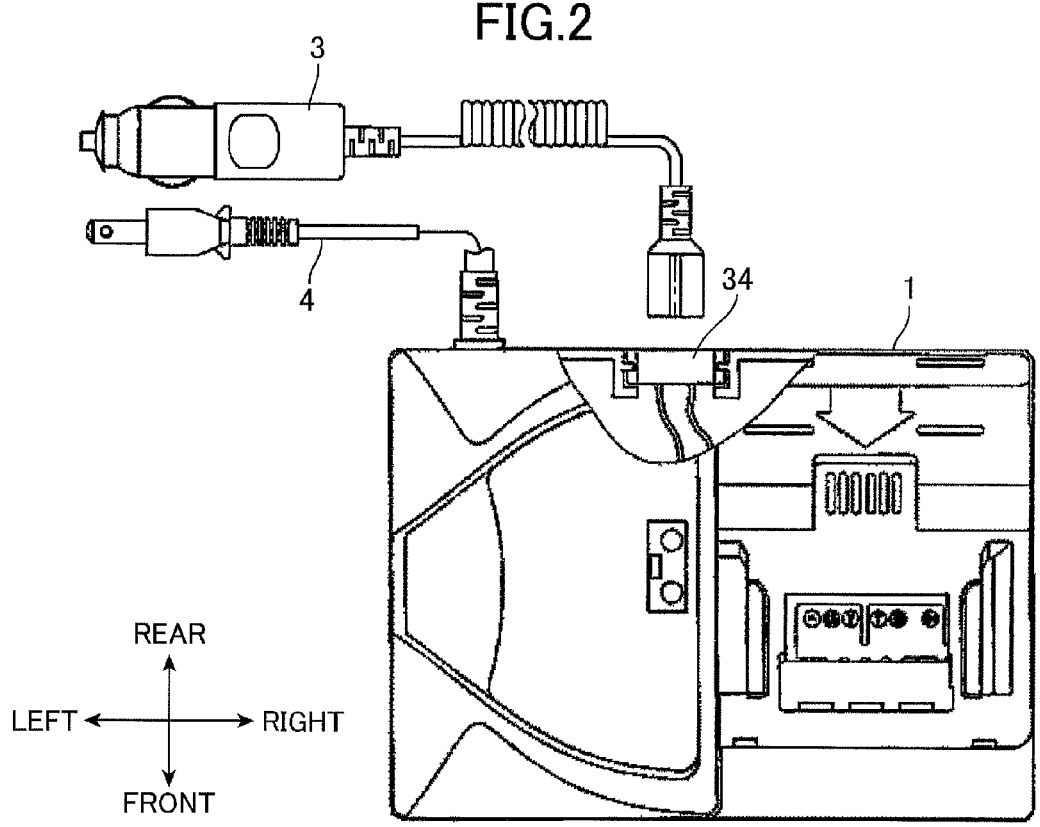
FIG. 2 is a top view of the battery charger shown in FIG. 1.
Figure 3:
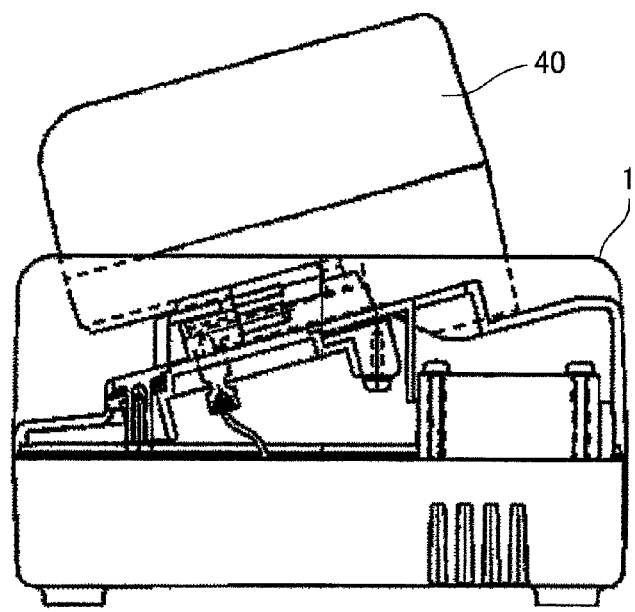
FIG. 3 is a right side view of the battery charger shown in FIG. 1 on which a battery pack is loaded.

A battery charger in accordance with one embodiment of the invention will be described with reference to the accompanying drawings. FIG. 1 is a perspective view and FIG. 2 is a partially cut-away top view showing a battery charger in accordance with the embodiment of the invention. FIG. 3 is a right side view of the battery charger on which a battery pack to be recharged is loaded.

As shown in FIG. 1, the battery charger 1 has an upper housing 6 and a lower housing 7. The upper housing 6 and the lower housing 7 constitute in combination a housing of the battery charger 1. The lower housing 7 is shaped into a rectangular parallelepiped and has a bottom wall and a rectangular top opening. The upper housing 6 is adapted to cover the rectangular top opening of the lower housing 7. A battery-holding portion 8 is formed in the upper housing 6 at a right half thereof. The battery-holding portion 8 has a sloping surface 8a inclining downwards from the rear-side to the front-side of the upper housing 6.

Slide rails 8b are formed in the sloping surface 8a of the battery-holding portion 8. Top surface of each slide rail extends parallel to the sloping surface 8a. A battery pack 40 (see FIG. 3) has an outer surface provided with rails slidably movable on the slide rails 8a.

A terminal cover 9 is provided at a lower portion of the sloping surface 8a. Terminals are exposed to an atmosphere at the terminal cover 9.

For loading the battery pack 40 with the battery charger 1, the battery pack 1 is inserted in a direction indicated by an arrow on the upper surface of the upper housing 6 so that the rails of the battery pack 1 are engaged with and slidingly moves along the slide rails 8b downwards toward the front-side of the sloping surface 8a. Thus, the terminals of the battery pack 40 are brought into electrical and physical contact with the corresponding terminals of the battery charger 1.

As shown in FIG. 2, the battery charger 1 includes an AC cable 4 having one end fixedly connected to the body of the battery charger 1 and another end having a plug to be connected to a commercial AC power supply. The battery charger 1 also includes a connector 34 to which a DC cable 3 is detachably connected. The DC cable 3 is used to supply DC power from an external DC power supply to the battery charger 1.

Figure 4:
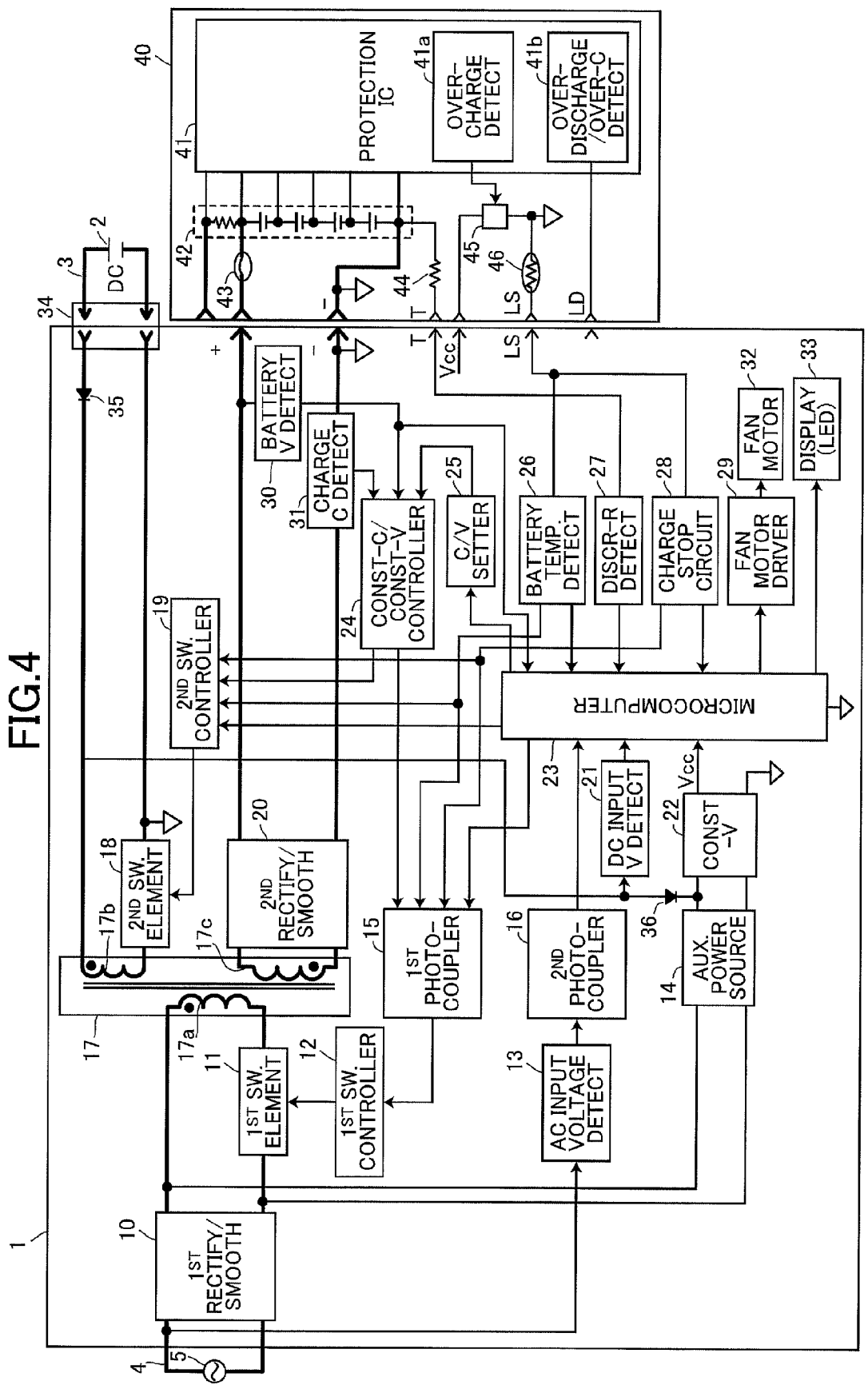
FIG. 4 is a block diagram showing electrical arrangements of the battery charger and a battery pack to be charged thereby.

FIG. 4 is a block diagram showing electrical arrangements of the battery charger 1 and the battery pack 40. As described with reference to FIG. 2, the AC cable 4 of the battery charger 1 is typically connected to the commercial AC power supply 5 and the DC cable 3 is used to connect the battery charger 1 to the external DC power supply 2 when the commercial AC power supply 5 is not available.

An electrical arrangement of the battery pack 40 will firstly be described. The battery pack 40 includes a battery 42 having a prescribed number of cells connected in series. The battery pack 40 also includes a protection IC 41, a thermal protector 43 for preventing undue temperature rise of the battery pack 40 which may occur during charging the battery 42, a discrimination resistor 44, an over-charge signal transmission device 45, and a thermistor 46. The battery pack 40 has positive (+), negative (−), T, LS and LD terminals to be connected to the corresponding terminals at the side of the battery charger 1. The protection IC 41 includes an over-charge detector 41a and an over-discharge/over-current detector 41b.

Each cell of the battery 42 is connected to the protection IC 41 so that the protection IC can monitor the voltage developed across each cell of the battery 42 and an overall voltage developed across the positive and negative terminals of the battery 42. The over-charge detector 41a outputs an abnormal signal to the LS terminal via the over-charge signal transmission device 45 when the voltage of at least one of the cells exceeds a predetermined cell voltage and when the voltage across the battery 42 exceeds a predetermined battery voltage. The over-discharge/over-current detector 41b outputs an abnormal signal to the LD terminal when the loaded battery pack 40 is judged to be in an overly discharged state or when the charge current flowing in the battery 42 exceeds a predetermined maximum. The abnormal signal output from the LD terminal of the battery pack 40 will not be described further, as this signal is not directly related to the operation of the battery charger in accordance with the embodiment of the invention.

The battery discrimination resistor 44 is connected between the negative terminal of the battery 42 and the T terminal. The discrimination resistor 44 has a specific resistance value depending upon the battery 42 used in the battery pack 40. More specifically, the resistance of the discrimination resistor 44 is set to indicate the type of the battery 42 and the number of cells constituting the battery 42. The thermistor 46 is disposed in contact with or in the vicinity of the battery 42 to detect the temperature of the battery 42. The output of the thermistor 46 can be derived from the terminal LS.

Next, an electrical arrangement of the battery charger 1 will be described.

The battery charger 1 is a computer-controlled device including the microcomputer 23. Although not shown, the microcomputer 23 includes a CPU, a ROM, a RAM, an input port and an output port. To the input port of the microcomputer 23, connected are a battery temperature detector 26, a discrimination resistance detector 27, a charge stop circuit 28, a DC input voltage detector 21, a constant voltage circuit 22, and a battery voltage detector 30. To the output port of the microcomputer 23, connected are a first switching controller 12 via a fist photo-coupler 15, a second switching controller 19, a current/voltage setter 25, a fan motor 32 via a fan motor driver 29, and a display 33.

Among the components connected to the input port of the microcomputer 23, the battery temperature detector 26 has an input connected to an LS terminal of the battery pack 40 and detects the temperature of the battery 42 based on the resistance value of the thermistor 46. The discrimination resistance detector 27 has an input connected to a T terminal of the battery pack 40 and detects the resistance value of the discrimination resistor 44 contained in the battery pack 40. The microcomputer 23 determines the type of the battery and the number of cells based on the resistance value of the discrimination resistor 44 detected by the discrimination resistance detector 27. Based on the resistance value of the discrimination resistor 44 and further on the temperature of the battery 42 detected by the battery temperature detector 26, the microcomputer 23 determines the charge current or a set value for effecting the constant voltage control and outputs a corresponding instruction to the current/voltage setter 25.

The charge stop circuit 28 is connected to the LS terminal of the battery pack 40 and receives an abnormal signal from the over-charge detector 41a in the protection IC 41 of the battery pack 40 through the over-charge signal transmission device 45 when the over-charge detector 41a detects that any of the battery cell or the battery 42 as a whole is brought to an over-charge condition. In this case, the charge stop circuit 28 outputs a charge stop signal to the microcomputer 23. The charge stop signal is also sent to the first switching controller 12 via the first photo-coupler 15, and to the second switching controller 19, so that charge of the battery is stopped.

The battery voltage detector 30 is connected to the positive terminal (+) of the battery charger 1 to detect the voltage across the battery 42. The voltage detected by the battery voltage detector 30 is applied not only to the microcomputer 23 but also to a constant-current/constant-voltage controller 24 to be described later. The battery charger 1 further includes a charge current detector 31 interposed in the negative line of a second rectifying/smoothing circuit 20 to be described later. The charge current detector 31 detects the charge current flowing in the battery 42 and applies the detected value to the constant-current/constant voltage controller 24.

The constant-current/constant-voltage controller 24 controls the first and second switching controllers 12 and 19 based on the outputs from the battery voltage detector 30, charge current detector 31, and the current/voltage setter 25. The current/voltage setter 25 sets a charge current to be flowed in the battery 42 and a set value for effecting a constant voltage control in accordance with an output from the microcomputer 23.

The battery charger 1 includes a high-frequency transformer 17 having a first primary winding 17a, a second primary winding 17b, and a secondary winding 17c. The commercial AC power supply 5 is connected to the first primary winding 17a via a first rectifying/smoothing circuit 10. The first rectifying/smoothing circuit 10 includes a diode bridge (not shown) and a capacitor (not shown). The diode bridge makes use of four diodes in a bridge arrangement to achieve full-wave rectification. The capacitor smoothes the DC output from the diode bridge. The output of the first rectifying/smoothing circuit 10 is connected to the first primary winding 17a of a high-frequency transformer 17 through a first switching element 11. An FET is used in this embodiment as the first switching element 11.

The second primary winding 17b of the high-frequency transformer 17 is connectable to the DC power supply 2 through the connector 34. A diode 35 is interposed in the positive line of the DC power supply 2, and a second switching element 18 is connected between the second primary winding 17b and the negative line of the DC power supply 2. An FET is used in this embodiment as the second switching element 18.

A second rectifying/smoothing circuit 20 is connected to the secondary winding 17c of the transformer 17 and the output from the second rectifying/smoothing circuit 20 is connected to the positive and negative terminals of the battery pack 40, thereby charging the battery 42 contained in the battery pack 40.

The first switching controller 12 is connected to the first switching element 11 and changes the width or duration of a driving pulse applied to the first switching element (FET) 11 in accordance with an instruction from the microcomputer 23 so that the output voltage of the second rectifying/smoothing circuit 20 is controlled. Likewise, the output port of the microcomputer 23 is also connected to the second switching controller 19. The second switching controller 19 changes the width or duration of a driving pulse applied to the second switching element (FET) 18 in accordance with an instruction from the microcomputer 23 so that the output voltage of the second rectifying/smoothing circuit 20 is controlled.

The charging circuit 1 further includes an AC input voltage detector 13 and an auxiliary power source circuit 14. The AC input voltage detector 13 detects the AC voltage applied from the commercial AC power supply 5. The detection output from the circuit 13 is applied to the microcomputer 23 through the second photo-coupler 16. The auxiliary power source circuit 14 is connected across the first rectifying/smoothing circuit 10 and supplies a prescribed voltage Vcc to the microcomputer 23 through a constant voltage circuit 22. The voltage Vcc is also applied to the over-charge signal transmission device 45.

The DC input voltage detecting circuit 21 is connected to the positive line of the second primary winding 17b for detecting that the DC power supply 2 is connected to the battery charger 1 through the connector 34.

The fan motor 32 is used for cooling the battery pack 40. The fan motor 32 is controlled by the microcomputer 23 depending on the status of the battery pack 40 and input status of the commercial AC power supply 5 or the DC power supply 2. When a battery mounted on a vehicle is used as the DC power supply 3, it may be desirable to stop driving the fan motor 33 during charging the battery pack 40 for the sake of preserving silence in the vehicle.

The display 33 is configured from one or more LEDs which indicate the charging statuses of the battery pack 40 and input statuses of the commercial AC power supply 5 and the DC power supply 2.

Figure 5A:
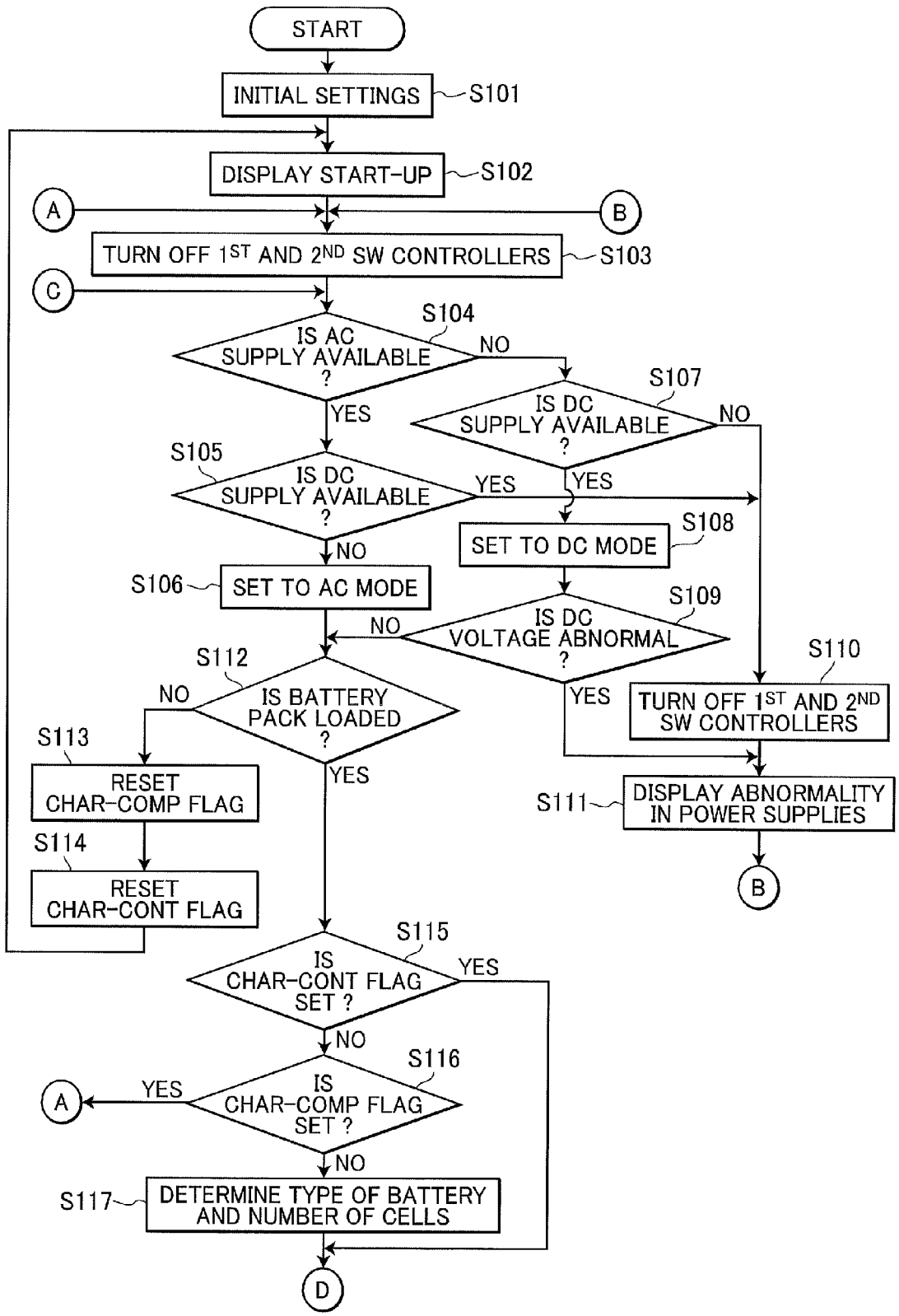
FIGS. 5A and 5B are a flowchart illustrating operations to be performed by the battery charger.
Figure 5B:
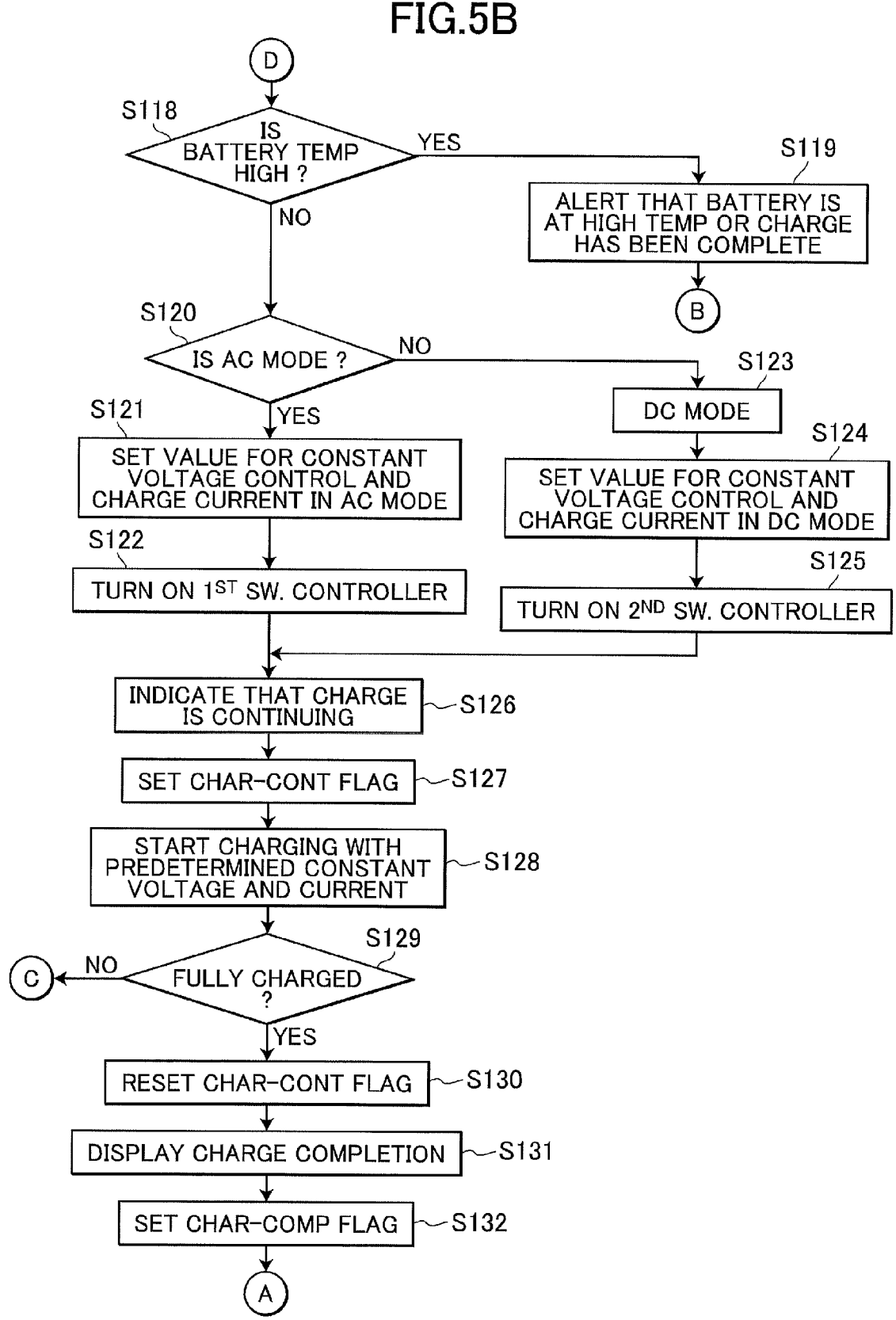

Next, operation of the battery charger 1 will be described with reference to the flowchart shown in FIGS. 5A and 5B.

When the battery charger 1 is powered by the commercial AC power supply 5 or DC power supply 2, the prescribed voltage Vcc is applied to the microcomputer 23 through the auxiliary power source 14 and the constant voltage circuit 22, whereupon initial settings of the microcomputer 23 are implemented (step 101). Then, the display 33 indicates that the battery charger 1 is in a start-up status or a ready status (step 102) by, for example, emitting red light from an LED.

Next, the microcomputer 23 turns off both the first and second switching controllers 12 and 19 so that no output voltage is generated from the second rectifying/smoothing circuit 20 (step 103). The microcomputer 23 then judges whether the input voltage from the commercial AC power supply 5 is available or not based on the input supplied from the AC input voltage detector 13 via the second photo-coupler 16 (step 104). When the microcomputer 23 determines that the AC power supply 5 is available (step 104: YES), further judgment is made based on the output from the DC input voltage detector 21 whether or not the input voltage from the DC power supply 2 is available (step 105). When the microcomputer 23 determines that no input voltage from the DC power supply 2 is available (step 105: NO), the microcomputer 23 sets the battery charger 1 to be operable with an AC mode (step 106).

When the microcomputer 23 determines that the commercial AC power supply 5 is not available (step 104: NO), further judgment is made as to whether or not the DC power supply 2 is available (step 107). When the DC power supply 2 is available (step 107: YES), the microcomputer 23 sets the battery charger 1 to be operable with a DC mode (step 108).

Subsequently, the microcomputer 23 judges whether or not the voltage from the DC power supply 2 is abnormal (step 109). When the microcomputer 23 finds no abnormality in the voltage of the DC power supply 2 (step 109: NO), the routine proceeds to step 112 whereas when the microcomputer 23 finds that the voltage of the DC power supply 2 is abnormal (step 109: YES), the microcomputer 23 controls the display 33 to indicate that the power supply is not available or abnormal (step 111) by, for example, flickering red light emitted from the LED, whereupon the routine returns to step 103. When the voltage at the DC power supply 2 is abnormally low, charging the battery pack 40 is not performed to prevent the DC power supply 2, e.g., car battery, from being overly discharged.

When the microcomputer 23 determines that both the commercial AC power supply 5 and the DC power supply 2 are available (step 104: YES; step 105: YES), the microcomputer 23 turns off both the first and second switching controllers 12 and 19 (step 110). In such a case, the microcomputer 23 controls the display 33 to indicate that the power supplies are connected in error or to prompt the operator to check the connections of the power supplies (step 111) by, for example, flickering red light emitted from the LED, whereupon the routine returns to step 103.

When both the commercial AC power supply 5 and the DC power supply 2 are accidentally connected to the battery charger 1, the microcomputer 23 prohibits charging the battery. Because the use of the high-frequency transformer 17 and the constant-current/constant-voltage controller 24 concurrently in both the AC and DC modes makes the output voltage from the second rectifying/smoothing circuit 20 unstable.

When the microcomputer 23 determines that neither the AC power supply 5 nor the DC power supply 2 is available (S104: NO; S107: NO), the microcomputer 23 turns off both the first and second switching controllers 12 and 19 (step 110) and controls the display 33 to indicate a connection error of the power supplies or to prompt the operator to check the connections of the power supplies by, for example, flickering red light emitted from the LED (step 111).

After setting the battery charger 1 to either the AC mode (step 106) or the DC mode (step 108), the microcomputer 23 judges whether or not the battery pack 40 has been loaded in the battery charger 1 (step 112). When it is determined that the battery pack 40 has not been loaded (step 112: NO), a charge completion flag and a charge continuation flag are reset (steps 113 and 114), whereupon the routine returns to step 102.

When the microcomputer 23 determines that the battery pack 40 has been loaded in the battery charger 1 (step 112: YES), then the microcomputer 23 judges whether the charge continuation flag has been set (step 115). When the microcomputer 23 determines that the charge continuation flag has been set (step 115: YES), the routine skips to step 118. On the other hand, when the microcomputer 23 determines that the charge continuation flag has not been set (step 115: NO), then the microcomputer 23 further judges whether the charge completion flag has been set (step 116). When the microcomputer 23 determines that the charge completion flag has been set (step 116: YES), the routine returns to step 103. On the other hand, when the microcomputer 23 determines that the charge completion flag has not been set (step 116: NO), the microcomputer 23 determines the type of the battery 42 and the number of battery cells based on the output from the discrimination resistance detector 27 (step 117). Subsequently, the microcomputer 23 checks the temperature of the battery based on the output from the battery temperature detector 26 (step 118). When the microcomputer 23 finds that the battery is at a high temperature (step 118: YES), the microcomputer 23 controls the display 33 to alert the operator that the battery is at a high temperature or to indicate that the charge has been complete (step 119), whereupon the routine returns to step 103.

When the microcomputer 23 determines that the temperature of the battery is not high (step 118: NO), the microcomputer 23 makes further determination as to whether or not the battery charger 1 is to be operated under the AC mode (step 120). If negative, the microcomputer 23 determines that the battery charger 1 is to be operated under the DC mode (step 123), and sets a value to carry out a constant voltage control or a constant current control (step 124). In step 124, an optimum value for carrying out the constant voltage control or constant current control is selected based on the output from the discriminating resistance detector 27. Specifically, the charge current to implement the constant current control is selected to be lower when operated with the DC power supply 2 than when operated with the commercial AC power supply 5. This is because the power supplied from the DC power supply 2 is generally smaller than the power supplied from the commercial AC power supply 5. Further, it is desirable to set the charge current smaller as the number of battery cells increases. By so setting the charge current, charging efficiency can be enhanced and the service life of the battery pack 40 can be prolonged.

After execution of step 124, the microcomputer 23 turns on the second switching controller 19 (step 125) and thereafter the processing in step 126 is executed.

When the microcomputer 23 determines in step 120 that the battery charger 1 is to be operated under the AC mode, the microcomputer 23 sets a value for the constant voltage control or constant current control when using the commercial AC power supply 5 (step 121). In step 121, an optimum value for carrying out the constant voltage control or constant current control implemented under the AC mode is selected based on the output from the discriminating resistance detector 27. Specifically, the charge current to implement the constant current control is selected to be larger when operated with the AC power supply 5 than when operated with the DC power supply 2.

After execution of step 121, the first switching controller 12 is turned on (step 122), and the microcomputer 23 controls the display 33 to indicate that the charging operation is continuing by, for example, emitting orange light. To this effect, two LEDs, one emitting red light and the other emitting green light, are simultaneously lit. Then, the charge continuation flag is set (step 127), and charging the battery is commenced while applying a constant voltage or constant current to the battery. The charge to the battery is controlled by the first or second switching controller 12 or 19 based on the output from the constant-current/constant-voltage controller 24.

More specifically, when the battery is charged with the DC power supply 3, the second switching element (FET) 18 is driven in accordance with the output from the second switching controller 19, so that the output from the second rectifying/smoothing circuit 20 is controlled to produce a predetermined voltage or current. At this time, a voltage is also developed across the winding 17a, however, this voltage is blocked by a rectifying diode (not shown) provided in the first rectifying/smoothing circuit 10. Thus, the operator does not get an electrical shock even if he or she touches the plug (not shown) of the AC cable. The first switching element 11 is maintained off by the first switching controller 12, so the plug of the AC cable is safe for the operator.

Subsequently, the microcomputer 23 judges whether or not the battery 42 has reached a full charge condition (step 129). As is well known in the art, various methods are available for detecting the full charge condition. For example, a so-called $-\Delta V$ detection is used for detecting the full charge condition of nickel-cadmium batteries, in which it is determined that the battery has reached the full charge condition when a predetermined voltage drop occurs after reaching the peak voltage at the end of charge. Another method for detecting the full charge condition includes detecting a rate of battery temperature rise or a gradient of battery temperature during a predetermined interval, i.e., $\Delta T/\Delta t$, and determining that the battery has reached the full charge condition when an abrupt increase of $\Delta T/\Delta t$ is detected. Determination in step 129 for determining that the battery has reached the full charge condition may be made using one or more full charge detecting methods.

For the battery pack 40 containing a lithium ion battery, it is necessary to control the battery so that a voltage across each cell of the lithium ion battery does not exceed a predetermined voltage (for example, 4.2V) when the battery is charged under the constant voltage control or constant current control well known in the art. It is further necessary to implement the full charge detection when the charge current falls below a full charge discrimination value during charging the battery under the constant current control.

When determination is made in step 129 that the battery has not yet reached the full charge condition (step 129: NO), the routine returns to step 104, whereas when determination is made that the battery has reached the full charge condition (step 129: YES), the charge continuation flag is reset (step 130) and the display 33 is controlled to indicate that charging the battery has been completed (step 131) by emitting green light from an LED. Subsequently, the charge completion flag is set (step 132) and the routine returns to step 103.

As described above, the embodiment of the invention provides an easy-to-use battery charger that can automatically use selective one of two power supplies for charging the rechargeable batteries without increasing the size of the battery charger.

While the invention has been described in detail with reference to a specific embodiment thereof, it would be apparent to those skilled in the art that many modifications and variations may be made therein. For example, the embodiment describe above is configured to selectively use two power supplies, however, the circuit arrangement can be modified so that three or more power supplies can be selectively used.

In the embodiment described above, it is desirable that the display 33 be controlled to provide different indications during charging depending upon the remaining period of time up to completion of charge. For example, the display 33 may be configured from an LED and switched from continuous lighting to flickering when the remaining predicted period of time up to completion of charge becomes a prescribed time, thereby facilitating the operator to recognize the progress of charge.

Further, it is desirable that depending upon the type of power supply used, the lighting condition of an LED (display) be changed. For example, the LED may be flickered when the DC power supply is used, and a flickering interval may be changed as the charging progresses. On the other hand, when the AC power supply is used, the LED of the display 33 may be continuously lit. By flickering the LED when the DC power supply is used, consumption of energy in the DC power supply can be suppressed. This is particularly advantageous when a vehicle battery is used as the DC power supply for the battery charger.

In the above described embodiment, the DC cable is attachable to and detachable from the body of the battery charger. Hence, the DC cable can be detached from the body of the battery charger and put aside when the AC cable is frequently or continuously used.

While in the above described embodiment the AC cable is fixedly attached to the body of the battery charger, it may be modified so as to be attachable to and detachable from the body of the battery charger.

What is claimed is:

1. A battery charger comprising:
    a body that is connectable to a battery pack containing a battery to charge the battery;
        a first connecting member having one end connectable to a first power supply and another end connectable to the body;
        a second connecting member having one end connectable to a second power supply and another end connectable to the body;
    wherein the body comprises:
        a first voltage detector that detects a voltage generated by the first power supply;
        a second voltage detector that detects a voltage generated by the second power supply; and
        a control unit that selectively uses one of the first and second power supplies as a power source of the body in response to outputs from the first and second voltage detectors;
        a first switching element;
        a first switching controller connected to the first switching element for controlling the first switching element;
        a second switching element;
        a second switching controller connected to the second switching element for controlling the second switching element; and
        a transformer having a first primary winding to which the first power supply is connectable via the first switching element, a second primary winding to which the second power supply is connectable via the second switching element, and a secondary winding to which the battery pack is connected.

2. The battery charger according to claim 1, wherein the body further comprises a charge stop circuit that generates a charge stop signal in response to a charge stop instruction received from the battery pack, wherein the charge stop circuit applies the charge stop signal to both the first and second switching controllers to stop charging the battery.

3. The battery charger according to claim 1, wherein the control unit uses the first power supply when the output from the first input voltage detector indicates that the first power supply is connected to the first primary winding of the transformer whereas the control unit uses the second power supply when the output from the second input voltage detector indicates that the second power supply is connected to the second primary winding of the transformer.

4. The battery charger according to claim 1, wherein the control unit does not permit charging the battery when the outputs from the first and second input voltage detectors indicate that both the first and second power supplies are connected to the first and second primary windings of the transformer, respectively.

5. The battery charger according to claim 1, wherein the body further comprises:
    an output controller that controls a charge current or a charge voltage applied to the battery through the secondary winding of the transformer;
    a current/voltage setter that sets the charge current or a charge voltage applied to the battery,
    wherein the control unit further controls the current/voltage setter to set the charge current or the charge voltage depending upon the first power supply and the second power supply whichever is selected, and a status of the battery instructed from the battery pack.

6. The battery charger according to claim 5, wherein the battery pack instructs a temperature of the battery to the control unit as the status of the battery.

7. The battery charger according to claim 5, wherein the battery pack instructs a number of cells constituting the battery to the control unit as the status of the battery.

8. The battery charger according to claim 5, wherein the battery pack instructs a type of the battery to the control unit as the status of the battery.

9. The battery charger according to claim 1, wherein the first power supply is a commercial AC power supply.

10. The battery charger according to claim 1, wherein the second power supply is a DC power supply.

11. A battery charger comprising:
    a body that is connectable to a battery pack containing a battery to charge the battery;

a first connecting member having one end connectable to an AC power supply and another end;

a second connecting member having one end connectable to a DC power supply and another end; and a connector; and wherein a selected one of the another end of the first connecting member and the another end of the second connecting member is fixedly connected to the body and a remaining one of the another end of the first connecting member and the another end of the second connecting member is configured to be detachably connectable to the body through the connector.

12. The battery charger according to claim 11, wherein the body comprises:

a first voltage detector that detects a voltage generated by the AC power supply;

a second voltage detector that detects a voltage generated by the DC power supply; and a control unit that selectively uses one of the AC and DC power supplies as a power source of the body in response to outputs from the first and second voltage detectors.

13. The battery charger according to claim 12, wherein the body further comprises:

a first switching element;

a first switching controller connected to the first switching element for controlling the first switching element;

a second switching element;

a second switching controller connected to the second switching element for controlling the second switching element; and a transformer having a first primary winding to which the first power supply is connectable via the first switching element, a second primary winding to which the second power supply is connectable via the second switching element, and a secondary winding to which the battery pack is connected.

14. The battery charger according to claim 13, wherein the body further comprises a charge stop circuit that generates a charge stop signal in response to a charge stop instruction received from the battery pack, wherein the charge stop circuit applies the charge stop signal to both the first and second switching controllers to stop charging the battery.

15. The battery charger according to claim 13, wherein the control unit uses the AC power supply when the output from the first voltage detector indicates that the AC power supply is connected to the first primary winding of the transformer whereas the control unit uses the DC power supply when the output from the second voltage detector indicates that the DC power supply is connected to the second primary winding of the transformer.

16. The battery charger according to claim 13, wherein the control unit does not permit charging the battery when the outputs from the first and second voltage detectors indicate that both the AC and DC power supplies are connected to the first and second primary windings of the transformer, respectively.

17. The battery charger according to claim 13, wherein the body further comprises:

an output controller that controls a charge current or a charge voltage applied to the battery through the secondary winding of the transformer;

a current/voltage setter that sets the charge current or a charge voltage applied to the battery, wherein the control unit further controls the current/voltage setter to set the charge current or the charge voltage depending upon the AC power supply and the DC power supply whichever is selected, and a status of the battery instructed from the battery pack.

18. The battery charger according to claim 17, wherein the battery pack instructs a temperature of the battery to the control unit as the status of the battery.

19. The battery charger according to claim 17, wherein the battery pack instructs a number of cells constituting the battery to the control unit as the status of the battery.

20. The battery charger according to claim 17, wherein the battery pack instructs a type of the battery to the control unit as the status of the battery.

21. The battery charger according to claim 11, wherein the AC power supply comprises a commercial AC power supply.

* * * * *